United States Patent [19]

Farrior, Jr.

[11] 4,089,809

[45] May 16, 1978

[54] REGENERABLE SORBENT AND METHOD FOR REMOVING HYDROGEN SULFIDE FROM HOT GASEOUS MIXTURES

[75] Inventor: William L. Farrior, Jr., Morgantown, W. Va.

[73] Assignee: The United States of America as represented by the United States Department of Energy, Washington, D.C.

[21] Appl. No.: 646,782

[22] Filed: Mar. 1, 1976

[51] Int. Cl.$^2$ .................. B01J 21/08; B01J 23/74
[52] U.S. Cl. .................................... 252/459; 252/191; 423/231
[58] Field of Search ............... 423/230, 244, 237, 231; 252/191, 459

[56] References Cited

U.S. PATENT DOCUMENTS

| 1,412,452 | 4/1922 | Coolbaugh | 423/244 |
| 2,839,356 | 6/1958 | Karl | 423/239 |
| 3,579,293 | 5/1971 | Schulz et al. | 423/231 |
| 3,978,001 | 8/1976 | Meyer | 252/459 |

OTHER PUBLICATIONS

Fujii et al., "Melting Points of Iron Oxide Silica Mixtures & Microstructure of the Sintered Product," Chemical Abstracts, vol. 48, No. 9, May 10, 1954, abstract No. 4950c.

Primary Examiner—Earl C. Thomas
Attorney, Agent, or Firm—Dean E. Carlson

[57] ABSTRACT

Hydrogen sulfide is effectively removed from hot gaseous mixtures useful for industrial purposes by employing a solid absorbent consisting of silica-supported iron oxide in pellet form.

3 Claims, No Drawings

REGENERABLE SORBENT AND METHOD FOR REMOVING HYDROGEN SULFIDE FROM HOT GASEOUS MIXTURES

The present invention relates generally to a matrix-supported absorbent for removing hydrogen sulfide ($H_2S$) from hot gaseous mixtures, and more specifically to a silica matrix-supported iron oxide composite useful for removing $H_2S$ from fuel gas producers.

Producer gas, such as that derived from coal gasification techniques, has been of considerable interest as a source of gas for use in various industrial purposes. This gas contains a quantity of $H_2S$ (usually less than 1.0 percent) which is preferably removed from the gas prior to its utilization due to the air polluting properties of the $H_2S$ as well as deleterious effects $H_2S$ and $SO_2$ have upon the equipment contacted by the hot producer gas. When gas is burned, the $H_2S$ becomes $SO_2$ which is less reactive than $H_2S$ but more difficult to remove because of its reactivity and dilution during combustion of the producer gas. Iron oxide ($Fe_2O_3$) powder has been previously used for removing $H_2S$ from producer gas, but has met with some problems which are primarily due to a relatively low temperature limit and the massive attrition $Fe_2O_3$ undergoes when it absorbs hydrogen sulfide. The attrition of the $Fe_2O_3$ causes corrosion as well as the plugging of various equipment components. The deterioration of the $Fe_2O_3$ requires that it be replaced with fresh $Fe_2O_3$ particulates of the desired size.

It was found that the attrition problems suffered by the iron oxide could be substantially minimized by supporting the $Fe_2O_3$ in a suitable matrix. For example, in assignee's U.S. Pat. No. 3,579,923 to Forrest G. Shultz et al. and entitled "Removal of Hydrogen Sulfide From Gaseous Mixtures," the $H_2S$ absorbent consisted of sintered pellets made from a mixture of fly ash and iron oxide. With this fly ash-supported iron oxide absorbent the attrition of the $Fe_2O_3$ was substantially minimized during operation and regeneration at temperatures in the range of 1000°–1500° F. This absorbent allowed the producer gas to be stripped of the $H_2S$ at relatively high temperatures.

The mechanism by which the $H_2S$ is removed from producer gas by using $Fe_2O_3$ is shown below where the $Fe_2O_3$ absorbs the $H_2S$ to form a mixture of FeS and $FeS_2$ according to the following reactions where for the purpose of illustration this mixture is shown as $FeS_{1.5}$.

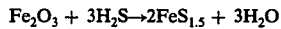
$$Fe_2O_3 + 3H_2S \rightarrow 2FeS_{1.5} + 3H_2O$$

The iron oxide may be regenerated for subsequent use by contacting the iron oxide at elevated temperature with air for oxidizing the FeS and $FeS_2$ to form $Fe_2O_3$ and $SO_2$ by the reaction:

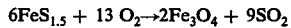
$$6FeS_{1.5} + 13\ O_2 \rightarrow 2Fe_3O_4 + 9SO_2$$

The excess oxygen in the air used during the regeneration is utilized to convert the resulting $Fe_3O_4$ to iron oxide by the reaction:

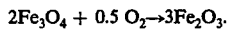
$$2Fe_3O_4 + 0.5\ O_2 \rightarrow 3Fe_2O_3.$$

While the fly ash-supported iron oxide absorbent disclosed in assignee's patent provided a significant improvement in the use of solid absorbents for removing $H_2S$ from hot gaseous mixtures, it was determined that further improvements would be even more desirable.

For example, it was found that the maximum useful concentration of $Fe_2O_3$ in the fly ash-supported mixture was approximately 25 weight percent since with greater $Fe_2O_3$ concentrations the capacity of the sorbent decreased due to surface area and heat resistance limitations of the fly ash-supported material. With this maximum useful concentration of $Fe_2O_3$ the absorption capacity of the absorbent was found to be in a range of about 10–12 grams $H_2S$ per hundred grams absorbent at 1200° F. The upper temperature useable for $H_2S$ sorption and regeneration with the fly ash-supported iron oxide was limited to about 1500° F. since above this temperature substantial fusion of the fly ash-supported $Fe_2O_3$ occurs which causes an excessive reduction in porosity so as to render it ineffective as a sorbent.

It is desirable to employ an absorbent having the capabilities of use at higher temperatures, i.e., above 1500° F., in both the $H_2S$ sorption and regeneration cycles. For example, in the $H_2S$ sorption cycle, it is advantageous to remove the $H_2S$ near the production temperature of the producer gas so as to preserve the sensible heat of the gas for use in the heat consuming industrial application. Temperatures at which the producer gas is formed is in the range of about 1000°–1800° F. Removal of the $H_2S$ from the gas at these temperatures necessitates the use of a sorbent that is not volatile in the temperature range and which does not form a stable compound by reacting with $H_2S$. Further, the absorbent must be regenerable without creating atmospheric or process pollution problems. Also, the regeneration of the absorbent at temperatures higher than 1500° F. is believed to be advantageous since $SO_2$ may be recirculated to react with FeS and $FeS_2$ to produce elemental sulfur in accordance with the equations:

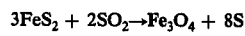
$$3FeS_2 + 2SO_2 \rightarrow Fe_3O_4 + 8S$$

and

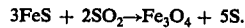
$$3FeS + 2SO_2 \rightarrow Fe_3O_4 + 5S.$$

These reactions are endothermic and include the subsequent oxidation of $Fe_3O_4$ to $Fe_2O_3$ and would utilize or evolve less heat than in the case where the regeneration is achieved by oxidation to $Fe_2O_3$ and $SO_2$ alone. Also, since FeS has the lowest melting point of any material employed in the system, it will tend to act as a flux which will slowly melt the supporting matrix resulting in the slow conversion of a relatively non-porous homogeneous glass with virtually no sorption capacity. Consequently, in the fly ash-supported sorbent temperatures above 1500° F. in either the sorption or regeneration cycle would damage the fly ash-supported iron oxide pellets especially in the regeneration cycle due to the fusing of the surface of the pellets so as to decrease the porosity thereof and effectively end the useful life of the sorbent.

Accordingly, it is the principal objective or aim of the present invention to provide a solid sorbent for removing $H_2S$ from hot gaseous mixtures at higher temperatures during $H_2S$ sorption and regeneration cycles than previously useable with the fly ash-supported sorbent as well as providing a higher percentage of iron oxide available in the mixture for reaction with the $H_2S$. It is also the principal aim of the present invention to provide a sorbent with greater physical strength and sorption capacity than previously available. These goals of the present invention are achieved by employing a silica (refractory) material in place of the fly ash (glass) for providing the matrix for the $Fe_2O_3$. It was found that sintered pellets of silica and iron oxide particulates with a concentration of iron oxide in the range of about 25-50 weight percent successfully achieved the aforementioned goals by providing for the support of almost 100 percent more $Fe_2O_3$ than previously useable as well as significantly higher $H_2S$ absorption and/or regeneration temperatures than available with the fly ash-supported iron oxide.

Other and further objects of the invention will be obvious upon an understanding of the illustrative embodiment and method about to be described, or will be indicated in the appended claims, and various advantages not referred to herein will occur to one skilled in the art upon employment of the invention in practice.

Described generally, the present invention relates to a solid pelletized sorbent for removing $H_2S$ from hot gaseous mixtures, especially low Btu gas made from the gasification of coal. This low Btu gas had an average heat value of about 150 Btu per cubic foot which is normally too low for transmission over long distances, but is suitable for use as a fuel for on-site power-generating applications. Removal of the $H_2S$ from the low Btu gas promises to be less expensive than the removal of sulfur dioxide from power plant stack gases and affords as much as 10 percent savings on energy in the form of sensible heat in the producer gas. In the removal of the $H_2S$ from the raw producer gas at or above 1100° F. by passing the producer gas through a fixed bed of matrix-supported iron oxide, the $H_2S$ reacts with the iron oxide to form a stable compound of sulfur with the iron in the form of FeS and $FeS_2$, as mentioned above. When the sorbent is sulfided the sorbent is regenerated to form elemental sulfur which is useful in other applications.

The solid $H_2S$ absorbent of the present invention is a pelletized sintered mixture of silica and iron oxide particulates. These pellets may be formed in any suitable manner, such as by mixing the $Fe_2O_3$ and silica in powder form with a sufficient quantity of water or any other suitable readily volatile wetting material to provide a putty-like mass which can be extruded in any suitable mechanism into rods having a diameter of about ¼ to ⅜ inch. The extruded rods may then be cut into segments of desired length in the range of about ¼ to ½ inch. These segments may then be dried in an oven at a temperature of about 200°-400° F. and then sintered in an oxidizing atmosphere, e.g., air, at a temperature in the range of about 1800°-2000° F. for a duration in the range of about 30 to 60 minutes. Alternatively, the pellets may be of a spherical configuration which may be provided by forming the silica-iron oxide-water mixture into spheres in a diameter in the range of about 0.001 to 0.4 inch prior to the drying and sintering operations similar to those described above.

The particle size of the $Fe_2O_3$ used to form the absorbent is preferably in a surface area range of about 5-100 $m^2/g$. It has been found that the better pellets are formed when the silica powder used in the admixture is of a size similar to that of the iron oxide, but satisfactory results may be achieved by using coarser or finer silica powder. The surface area of the silica powder satisfactorily employed in practice of the invention is preferably in the range of about 4-6.5 $m^2/g$. The concentration of the $Fe_2O_3$ in the pellets found to provide satisfactory $H_2S$ absorption is in the range of about 25-50 weight percent with the sorbent showing a generally linear response in increasing sorption capabilities as the concentration of the $Fe_2O_3$ increases from the 25 to 50 weight percent figure.

The crush strength and resistance to abrasion of a silica-supported iron oxide are significantly greater than that provided by the fly ash matrix and is in the range of about 70 to 100 lbs/cm. The crush strength and abrasion resistance may be further increased by the incorporation of a binder in the mixture prior to the extrusion or balling operation described above. Binders found useable include bentonite and sodium silicate with the concentration of the binders being in the range of about 1 to 3 percent for the bentonite which is added in powder form in a size range of about 30 to 80 microns and 5 to 20 ml of sodium silicate solution containing about 37 percent solids.

The $H_2S$ sorption capacity for the solid sorbent of the present invention is in the range of about 15 to 20 grams $H_2S$ sorbed for 100 grams sorbent. These absorption capacities were determined by employing a gaseous makeup mixture similar to low Btu gas generated by the gasification of coal. The absorption was achieved in a reaction vessel 45 inches in length with a 2-inch inside diameter. Seven hundred grams of the sorbent were supported on a stainless steel screen 31 inches from the top of the vessel. The reaction vessel was externally heated by heating tapes and was insulated to prevent excessive heat losses. Five internal thermocouples were used to monitor the reaction bed temperatures. The simulated producer gas was preheated to 1250° F. and the makeup gas heated to 1100° F. before the test run was initiated. The gas was piped into the vessel until a concentration of $H_2S$ in the effluent gas emanating from the reaction vessel reached 400 grains/100 scf. The $H_2S$ concentration in the gas was maintained at a level higher than in normal producer gas and the gas flow through the system was maintained close to 20 scfh until the $H_2S$ concentration in the effluent gas increased from an initial value of 15-30 grains/100 scf to an arbitrarily selected grain limit. The system was then shut down and purged with nitrogen for 30 minutes prior to regeneration. The regeneration of absorbent was provided in a narrow reaction zone that moved upward through the bed and was achieved with 12 scfh of air which could have produced temperatures in excess of 2000° F. in the reaction zone, but was controlled by adjusting the air flow rate and diluting with an inert gas to a temperature where the front of the bed was 1000° F. Then 12 scfh of air and 12 scfh of nitrogen were injected to maintain the bed temperature above 1000° F. and below 1500° F. without further adjustment. Normally, with a concentration of 1500-1800 grains $H_2S$/100 scf in a space velocity of 600, a little less than half of the time is required to regenerate the sorbent than that utilized to saturate it with $H_2S$.

Various physical properties of the silica-supported iron oxide absorbent including $H_2S$ absorption capacities for several examples of the absorbent are shown in the table below. In samples 1-10 and 11-13 the silica was of an average particle size of about 12.5 microns and 76 percent less than 5 microns, respectively.

TABLE

| Sorbent Number | Sorbent Silica | Sorbent $Fe_2O_3$ | Sorbent Binder | Sintering Conditions Temp. °F. | Sintering Conditions Time, min. | Crush Strength lbs/cm | Surface Area $m^2/gm$ | $H_2S$ Capacity gms $H_2S$/100 gms sorbent |
|---|---|---|---|---|---|---|---|---|
| 1 | 75% | 25% |  | 1800 | 30 | 13.7±4.9 | — | 8.9 |
| 2 | 65% | 35% |  | 1800 | 30 | 19.3±7.6 | — | 12.5 |
| 3 | 55% | 45% |  | 1800 | 30 | 33.8±6.1 | 4.3 | 15.4 |
| 4 | 55% | 45% |  | 1850 | 30 | 39.6±19.2 | 3.2 | 16.6 |
| 5 | 55% | 45% |  | 1900 | 30 | 77.4±15.8 | 2.9 | 15.1 |
| 6 | 55% | 45% |  | 1950 | 30 | 75.5±13.9 | 2.5 | 16.1 |
| 7 | 55% | 45% | 0.5% bentonite | 1800 | 30 | 57.4±11.8 | 3.8 | 15.1 |
| 8 | 55% | 45% | 1.0% bentonite | 1800 | 30 | 31.4±6.7 | 4.3 | 14.5 |
| 9 | 55% | 45% | 10 ml SS./lb.* | 1800 | 30 | 48.2±7.1 | 3.1 | 22.4 |
| 10 | 55% | 45% | 6.25 ml S.S./lb | 1800 | 30 | 68.0±24.0 | 2.1 | 22.8 |
| 11 | 55% | 45% | 0.5% bentonite | 1800 | 30 | 36.1±7.3 | 5.3 | 16.2 |
| 12 | 55% | 45% | 1.0% bentonite | 1800 | 30 | 34.5±8.8 | 5.0 | 14.4 |
| 13 | 55% | 45% | 1.0 bentonite | 1850 | 30 | 40.0±14.7 | 4.3 | 15.1 |

*S.S. - sodium silicate

It will be seen that the silica-supported iron oxide sorbent of the present invention has a higher melting point than fly ash-supported sorbents which is believed to yield a greater heat resistance and longer life expectancy for the sorbent. Further, silica can be obtained with extremely uniform properties while the chemical composition of fly ash may change with combustion of different types coal. Also, the increased strength and increased abrasion resistance of the silica-supported sorbents over the fly ash-supported sorbents permit utilization of the former in moving bed type $H_2S$ sorption reactions so as to enable continuous replacement of the $H_2S$ sorbent with regenerated sorbents so as to significantly increase the efficiency of the operation. With the sorbent of the present invention more varied coal gasification processes, such as fluid bed combustion and slagging gasifiers may be used to generate the producer gas. Also, the subject sorbent may be used in fuel liquefaction processes, such as the Fisher-Tropsch process, for removal of $H_2S$ from gaseous mixtures prior to liquefaction.

What is claimed is:

1. A solid sorbent for sorbing hydrogen sulfide from gaseous mixtures, said sorbent consisting essentially of a sintered admixture of $Fe_2O_3$ and silica particulates with the $Fe_2O_3$ being in the mixture in a concentration in the range of about 25–50 weight percent.

2. A solid sorbent as claimed in claim 1 with said solid sorbent being formed of $Fe_2O_3$ particulates having a surface area in the range of 5 to 100 $m^2$/g prior to sintering and silica particulates having a surface area in the range of 4 to 6.5 $m^2$/g prior to sintering.

3. A solid sorbent as claimed in claim 2, wherein a binder selected from the group consisting of bentonite and sodium silicate is incorporated in the admixture before the sintering thereof with the bentonite being in a concentration of 1 to 3 weight percent and the sodium silicate being in a concentration of 5 to 20 ml solution.

* * * * *